(12) United States Patent
Kowalczyk et al.

(10) Patent No.: US 7,842,423 B2
(45) Date of Patent: Nov. 30, 2010

(54) LITHIUM METAL ANODE CONSTRUCTION FOR SEAWATER OR AIR SEMI-FUEL CELLS HAVING FLEXIBLE POUCH PACKAGING

(75) Inventors: Ian Kowalczyk, Harleysville, PA (US); William Eppley, Skippack, PA (US); Mark Salomon, Little Silver, NJ (US); David Chua, Wayne, PA (US); Benjamin Meyer, Landsdale, PA (US)

(73) Assignee: MaxPower, Inc., Harleysville, PA (US)

( * ) Notice: Subject to any disclaimer, the term of this patent is extended or adjusted under 35 U.S.C. 154(b) by 841 days.

(21) Appl. No.: 11/586,327

(22) Filed: Oct. 25, 2006

(65) Prior Publication Data

US 2008/0102358 A1 May 1, 2008

(51) Int. Cl.
*H01M 12/06* (2006.01)
*H01M 2/06* (2006.01)
*H01M 6/34* (2006.01)

(52) U.S. Cl. .................. 429/403; 429/119; 429/126; 429/127; 429/128; 429/185

(58) Field of Classification Search ............ 429/27, 429/119, 126, 127, 128, 137, 162, 185, 403
See application file for complete search history.

(56) References Cited

U.S. PATENT DOCUMENTS

| 5,326,652 | A | * | 7/1994 | Lake ........................ 429/127 |
| 5,510,209 | A |   | 4/1996 | Abraham et al. ....... 429/231.95 |
| 6,432,584 | B1 |  | 8/2002 | Visco et al. ................. 429/310 |
| 6,488,721 | B1 | * | 12/2002 | Carlson ................. 429/137 X |
| 6,528,204 | B1 | * | 3/2003 | Hikmet et al. ............. 429/128 |
| 6,566,012 | B1 | * | 5/2003 | Kobayashi et al. ......... 429/254 |
| 2007/0037058 | A1 | * | 2/2007 | Visco et al. ............ 429/185 X |

OTHER PUBLICATIONS

Abstract # CI-09900 of 209th Electrochemical Society Meeting May 12, 2006: "Electrospun Membranes for Li-ion Batteries".

* cited by examiner

*Primary Examiner*—Stephen J. Kalafut (57) ABSTRACT

Lithium metal anode protection, and various semi-fuel cell constructions for use in deep, high pressure seawater or air media are provided. The described lithium semi-fuel cells achieve record high energy densities, due to the high energy density of lithium anode and the use of the cathode reactant from the surrounding media, which is not part of the cell weight, and the use of ultralight and flexible packaging materials. These features make the described semi-fuel cells the ideal choice for powering underwater and air vehicles.

20 Claims, 8 Drawing Sheets

FIGURE 15 though apparent from the description and appended claims.

LITHIUM METAL ANODE CONSTRUCTION FOR SEAWATER OR AIR SEMI-FUEL CELLS HAVING FLEXIBLE POUCH PACKAGING

CROSS REFERENCE TO RELATED DOCUMENTS

The subject matter of the invention is shown and described in the Disclosure Document of Ian Kowalczyk et al., Ser. No. 603,189 filed on Jul. 7, 2006 and entitled "Lithium Metal Anode Construction for Seawater or Air Semi-Fuel Cells Having Flexible Pouch Packaging."

BACKGROUND OF THE INVENTION

1. Field of the Invention

This invention pertains mostly to a lithium metal anode and cell construction having suitable multi-layer protection for use in high pressure lithium-seawater or lithium-air semi-fuel cells, while providing a very high energy density.

2. Description of the Prior Art

Lithium-water and lithium-air primary batteries are the batteries of choice for various military applications, like unmanned underwater vehicles and unmanned air vehicles, due to their record high practical energy densities (1000 Wh/kg). However, the prior art underwater lithium batteries suffer from limitations of their use in relatively shallow depths, due to their low resistance to the high water pressure. Prior art lithium-air batteries do not utilize their full potential in energy density, due to their relatively heavy packaging structures. The prior art cell sizes are also limited by available ceramic layer, which can not be made in large sheets due to the brittleness of this material. Examples of the prior art batteries are described in U.S. Patents of Abraham et al. U.S. Pat. No. 5,510,209 and Visco et al. U.S. Pat. No. 6,432,584 B1. Therefore, it is desirable to provide a better protective structure of the cells and their anodes, which structures can withstand higher water pressure and also be very lightweight, and of a modular design.

The lithium anode and cell construction of the present invention does not suffer from prior art problems and provides many positive advantages.

SUMMARY OF THE INVENTION

It has now been found, that an underwater cell with a lithium anode, which can withstand higher water pressure than prior art cells, can be made by packaging the anode in a multilayer flexible metal foil pouch, which is coated with a plastic layer and heat sealed, and which hermetically encapsulates the lithium metal electrode. Because this packaging is flexible and compliant, it can withstand much higher water pressure than any hard structures of the prior art packaging. The lithium anode is preferably of a flat metal foil, additionally protected from the surrounding media on the active side by a flexible electro-spun polyimide-based porous membrane, soaked with a non-aqueous lithium-ion conducting electrolyte, which is stable against lithium. On top of this membrane and in contact is a water impermeable, solid-state lithium-ion conducting glass-ceramic layer facing the seawater or air cathode, through an opening in the flexible pouch packaging. Resulting frame of the flexible pouch around the solid state ceramic layer is also heat sealed to the solid state ceramic layer. It is a major discovery, that the flexible metal pouch packaging is heat sealable to the solid state ceramic layer, and also that the electro-spun membrane can be electro-spun directly onto the lithium anode foil.

In case of lithium metal-seawater semi-fuel cells, preferably porous carbon or a metal flat cathode is facing the solid state ceramic layer in its proximity or in contact with said ceramic layer, and is also submerged into the seawater.

Both electrodes have metal terminals electrically connected to the electrodes and insulated from the surrounding water.

In case of lithium-air semi-fuel cells, an identical anode structure as described is used, but the cathode electrode structure is of well known fuel cell porous carbon type, in contact with said ceramic layer and attached to the ceramic insulating separator layer by another frame, preferably of the same flexible pouch material, which is heat welded to the anode frame. The outer opposite side of the cathode is facing an air flow and permits the oxygen in the air to enter the cathode. The inner porous carbon side of the cathode is preferably wetted by an aqueous $H_2SO_4$, or KOH based electrolyte, which is in contact with the ceramic separator layer, as described in our prior patent application Ser. No. 11/418,629 now abandoned.

The underwater cells may be identically constructed except the aqueous $H_2SO_4$ or KOH electrolyte is replaced with seawater soaked into the cell cathode. In both applications, the cells may be constructed with a large area cathode, facing a plurality of several smaller anodes, electro-spun membranes, and ceramic separators, due to the size limitation of the ceramic separators, thus making a production of large lithium-seawater and lithium-air semi-fuel cells possible.

Another variant of this construction may have one large anode plate with one large flexible electrospun membrane, with a plurality of smaller glass-ceramic separators facing one large area cathode.

In case of lithium-air semi-fuel cells only, the cells may be also constructed differently, having the ceramic separator and the aqueous electrolyte removed and a polymeric, oxygen selective, hydrophobic gel or hydrophobic solid-state membrane added onto the outer side of the cathode. This membrane prevents evaporation of the non-aqueous electrolyte in the electro-spun membrane and in the inner side of the cathode, and permits oxygen to selectively enter the cathode. It also prevents any moisture in the air to enter the cell.

The principal object of this invention is to provide high water pressure resistant lithium anodes and larger lithium seawater semi-fuel cells, which can operate in greater depths of the ocean over the prior art.

Another object of this invention is to provide larger and more lightweight lithium-air semi-fuel cells, having higher capacity and energy density over the prior art.

Other objects and advantages of the invention will be apparent from the description and appended claims.

BRIEF DESCRIPTION OF THE DRAWINGS

Like parts have the same numbers through several views and Figures.

It should, of course, be understood that the description and the drawings herein are merely illustrative, and it will be apparent that various modifications, combinations, and changes can be made of the structures and the systems disclosed without departing from the spirit of the invention and from the scope of the appended claims.

DESCRIPTION OF THE PREFERRED EMBODIMENTS

When referring to the preferred embodiments, certain terminology will be utilized for the sake of clarity. Use of such terminology is intended to encompass not only the described embodiment, but also all technical equivalents which operate and function in substantially the same way to bring about the same results.

Lithium-seawater and lithium-air anodes usually comprise a lithium foil protected by a hard, moisture impermeable and sealed structure, which has on the active side ion conductive layers facing the cathode. The surrounding medium, such as seawater, or oxygen in air enters the porous cathode layer and results in an open circuit potential slightly higher than 3 volts against lithium.

Present invention employs new and novel anode packaging structure, which utilizes a compliant, flexible pouch enclosure heat welded to a glass-ceramic ion conductive layer facing the cathode, which provides for cell operation in greater depth of the ocean and also results in higher energy density of lithium-air cells, due to the lightweight, flexible packaging.

Figure 1:
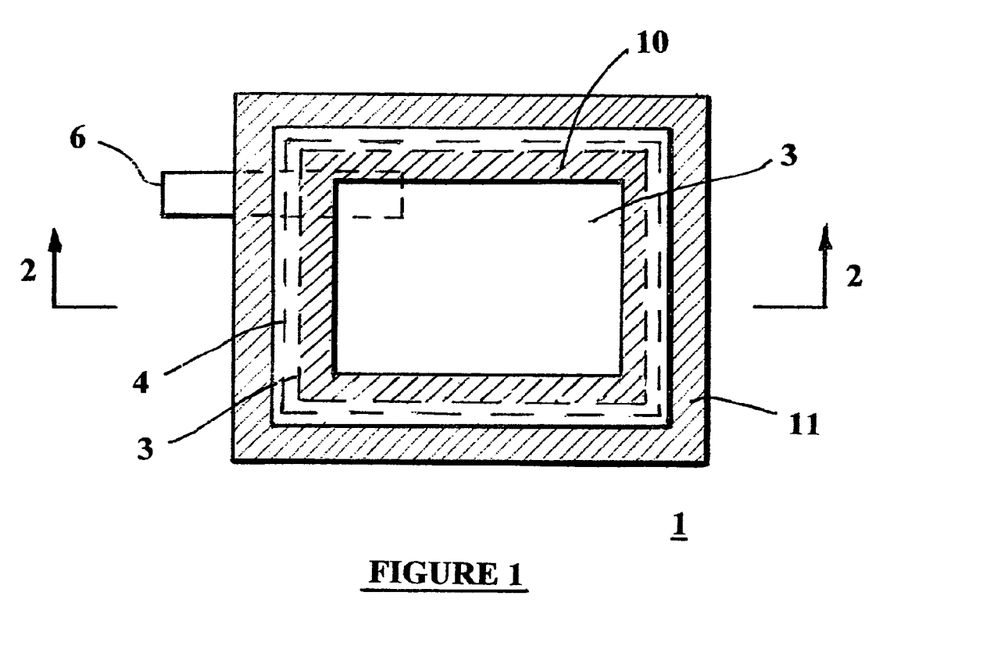
FIG. 1 is a top view of lithium-seawater or air anode packaging.
Figure 2:
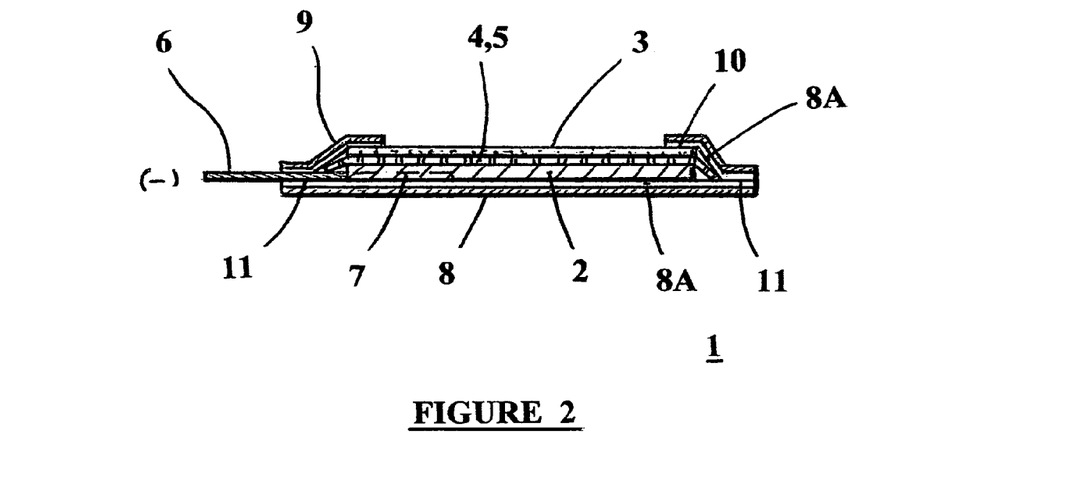
FIG. 2 is a vertical sectional schematic view, on the line 2-2 of FIG. 1, illustrating lithium anode construction for lithium-seawater and lithium-air semi-fuel cells, said anode being protected by a flexible polymer coated metal foil pouch, and electrospun membrane with a non-aqueous electrolyte, and a ceramic, lithium-ion conducting and water impermeable layer, facing the water or an aqueous electrolyte.

Referring now in more detail to the drawings of this patent, one embodiment of this invention can be understood by reference to FIGS. 1 and 2. The lithium anode packaging structure 1 for lithium-seawater or lithium-air cells comprises: lithium anode foil 2; at least one outer water-impervious, lithium-ion conducting solid state glass-ceramic layer 3; at least one inert, electrospun porous polyimide membrane 4, saturated with a lithium compatible and lithium-ion conductive electrolyte solution 5; at least one flat metal collector tab 6, which is press-joined with the anode 2 at the joint area 7; at least one base layer of flexible pouch 8, having a flexible metal foil, such as aluminum coated with a heat sealable insulating and flexible plastic layer 8A facing and in contact with the anode 2; and at least one flexible top frame 9, preferably of the same material as the bottom layer 8, having the plastic layer 8A facing the layer 3. The frame 9 is heat sealed to the ceramic layer 3 all around, as shown in the shaded area 10, and also to the bottom layer 8, as shown in the shaded area 11, preferably under vacuum. Preferred flexible material of 8 and 9 parts is manufactured by Pliant Corp., Chippewa Falls, Wis. The bottom layer 8 and frame 9 are also heat sealed to the tab 6, under vacuum.

It is a major discovery and finding, that the flexible pouch top frame 9 is heat sealable to the glass-ceramic layer 3, which glass-ceramic layer is preferably manufactured by OHARA, INC., Sagamihara-Shi, Japan, or Somerville, N.J., as LIC-GC product. This is another embodiment of the invention. The inert electro-spun membrane 4 is preferably electro-spun directly onto the lithium foil anode 2, and adheres to it, which is another embodiment of the invention and may be referred to as lithium spun membrane (LSM). The membrane 4 may be also a commercially available polyolefin micro-porous separator, such as manufactured by Celgard LLC, and others.

Figure 3:
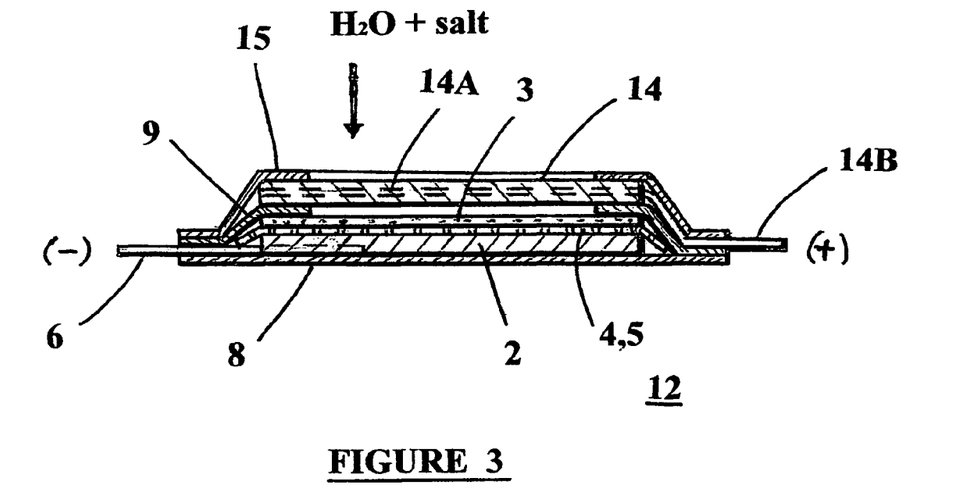
FIG. 3 is a sectional schematic view, illustrating lithium-seawater pouch single cell with an integrated porous carbon or metal cathode, facing the seawater.
Figure 4:
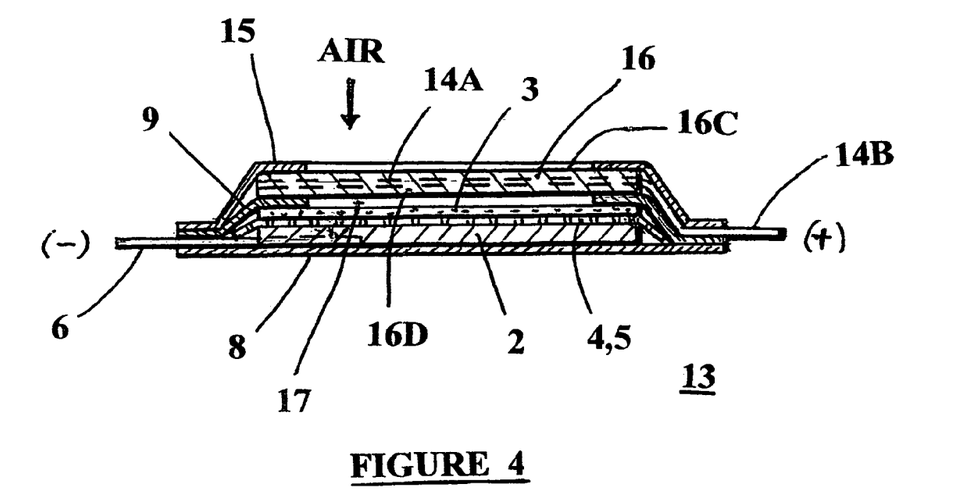
FIG. 4 is a sectional schematic view, illustrating lithium-air pouch single cell with an integrated porous carbon cathode, facing the air.

The described protected lithium anodes structures 1 can be incorporated into lithium-seawater single semi-fuel cell 12 as shown in FIG. 3, and lithium-air single semi-fuel cell 13 as shown in FIG. 4, which is another embodiment of the invention. The lithium-seawater cell 12 comprises:

The lithium anode 2 with its terminal tab 6 (−), protected as described above by the plastic coated flexible metal pouch parts 8 and 9, and ceramic layer 3 with membrane 4 saturated with the electrolyte 5; and porous carbon and/or metal cathode 14, preferably coated or laminated onto a porous metal grid or mesh current collector 14A, electrically connected to metal terminal tab 14B (+), such as a metal foil.

When this cell is submerged into the seawater, the seawater enters the pores of the cathode 14 and is ionically conductive. The cathode material must be hydrophilic to permit the water to soak inside and be in contact with the ceramic layer 3: The cathode 14 may be held in place by also flexible material frame 15, similar to the frame 9. The frame 15 may be heat sealed or welded to the cathode 14 and to the frame 9, and over the terminal 14B. The frame 15 has an electrically insulating plastic material facing the terminal tab 14A (+). The cathode 14 may also be just a metal piece submerged in the seawater in a proximity if the anode structure 1.

The lithium-air single semi-fuel cell 13 in FIG. 4 comprises:

All identical components as described for the cell 12, except the cathode 14 is replaced with fuel cell type cathode 16. The cathode 16 has porous carbon coated on the porous grid 14A, but carbon outer layer 16C is made hydrophobic by polytetrafluoroethylene coating. The inner carbon cathode layer 16D, facing the ceramic layer 3 is hydrophilic and is saturated by an electrolyte 17, such as aqueous $H_2SO_4$, or KOH based electrolyte, for example, as described in our prior patent application Ser. No. 11/428,629, which is herein incorporated by reference. The electrolyte 17 is in contact with ceramic layer 3. The cell 13 may also have an adhesive, removable tape covering the cathode 16 before use, to prevent evaporation of the electrolyte 17 (not shown).

Figure 5:
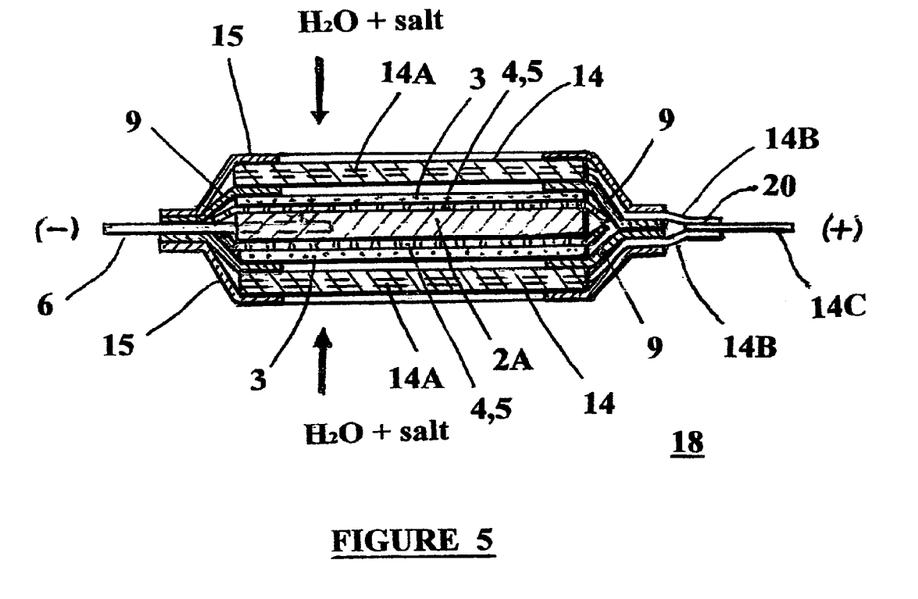
FIG. 5 is a sectional schematic view, illustrating lithium-seawater pouch bi-cell having integrated two porous carbon cathodes facing the seawater, and the protected lithium anode in the middle.
Figure 6:
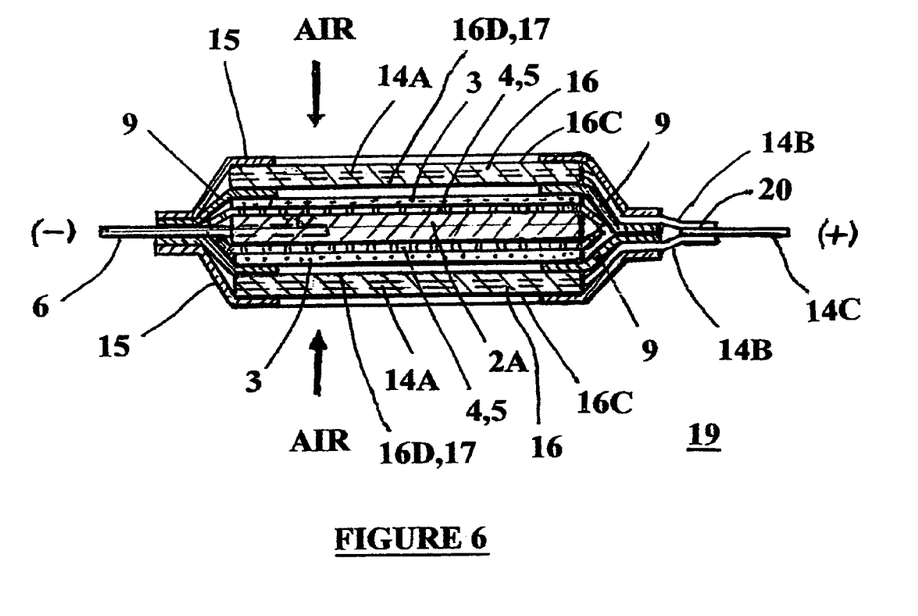
FIG. 6 is a sectional schematic view, illustrating lithium-air pouch bi-cell having integrated two porous carbon cathodes facing the air, and protected lithium anode in the middle.

Referring now to FIGS. 5 and 6 illustrating lithium-seawater and lithium-air bi-cells 18 and 19 respectively, which are another embodiment of the invention.

The bi-cell 18 as shown in FIG. 5 is a lithium-seawater semi-fuel cell and comprises:

Lithium anode 2A in the middle, protected on both sides by the layers 3 and 4 and by two flexible frames 9, (the membrane layers 4 are saturated with non-aqueous inert electrolytes 5); anode terminal tab 6 (−); two porous carbon cathodes 14 on the outside, facing the seawater, and having porous metal grids 14A embedded therein; two cathode terminal tabs 14B attached to the grids 14A and welded together at area 20 and to the final terminal tab 14C (+); and two outside frames 15 heat sealed (welded) to the frames 9. This configuration doubles the capacity of the prior single cell 12. The bi-cell 19, as shown in FIG. 6 is lithium-air semi-fuel cell and comprises:

All identical components as described for the cell 18, except the cathodes 14 are replaced with cathodes 16 having the outer layers 16C and the inner layers 16D, which inner layers 16D are saturated by the electrolyte 17, as described above. Both cathodes 16 may be also covered by the removable tape before use (not shown), to prevent evaporation of the electrolyte 17.

Figure 7:
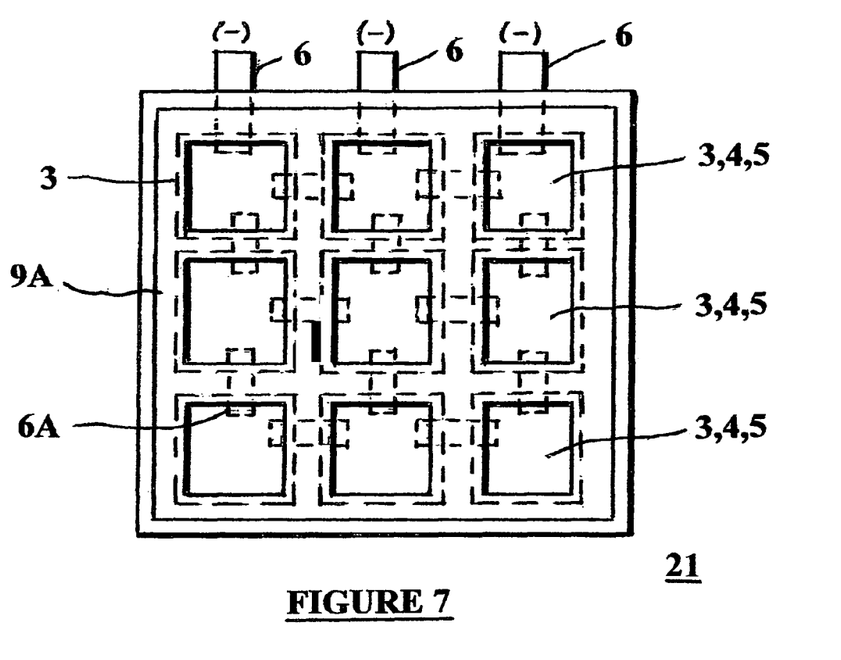
FIG. 7 is a top view of large lithium-seawater or air anode having multiple small ceramic separators, porous spun membranes and lithium foils sealed in one large flexible pouch, which positions and holds them in place together.
Figure 9:
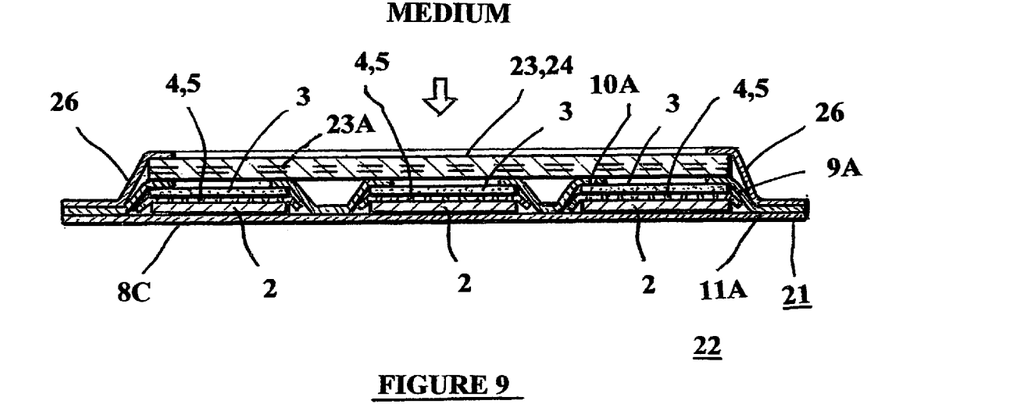
FIG. 9 is a vertical sectional schematic view, on line 9-9 of FIG. 8, illustrating large lithium-seawater or air single semi-fuel cell with one integrated porous carbon or metal cathode, facing the seawater or air, and all parts are held together by a flexible pouch material.

Referring now to FIGS. 7 and 9, showing packaging of a large anode 21 in a form of planar array, which is another embodiment of invention, and which comprises for example, nine smaller lithium anodes 2, nine ceramic layer 3, nine electrospun membranes 4, saturated with electrolyte 5, all held together in place by a flexible top frame 9A, heat sealed (welded) to the ceramic layers 3 in areas 10A and to bottom flexible layer 8C under vacuum, in area 11A as shown in FIG. 9, and as is similarly described for the cell 1 (area 10 and 11). Terminal tabs 6 (−) are attached to anodes 2 and sealed identically as described for the cell 1. Additionally, the anodes 2 are connected together by flat metal connectors 6A, which connectors are sandwiched and sealed between parts 8C and 9A identically as terminal tabs 6. This provides for electrical current flow from all anodes 2 to the terminal tabs 6 (−), which tabs maybe connected together (not shown). It should be noted, that any desired quantity of small anodes 2 may be similarly protected and connected together to create one large anode, facing a one piece large cathode. This is necessary, due to the limited size of ceramic layers 3 available.

Figure 8:
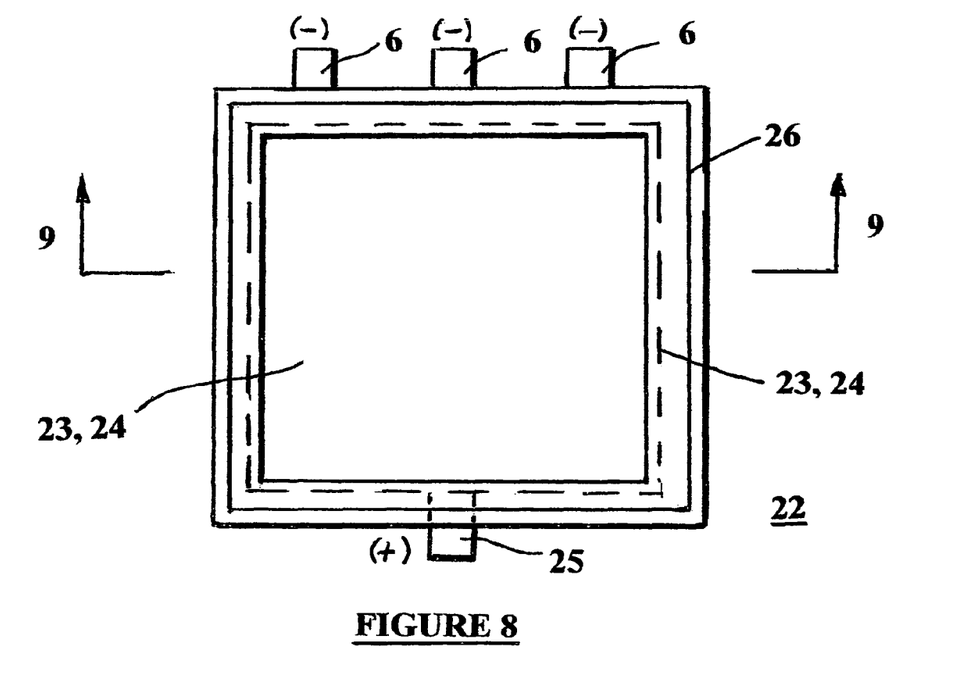
FIG. 8 is a top view of a large lithium-seawater or air semi-fuel cell.

Referring now to FIGS. 8 and 9, showing large single lithium-seawater or lithium-air semi-fuel cell 22, which is another embodiment of the invention, and which comprises: Anode assembly 21, with terminal tabs 6 (−), as described above in FIG. 7; cathode 23 for lithium-seawater cell, or cathode 24 for lithium-air cell, coated on a porous metal grid 23A, electrically connected to cathode terminal 25 (+); and cathode flexible top frame 26 welded to the anode assembly 21. The difference in construction between cathodes 23 and 24 is the same as described for cathode 14 and 16. The top frame 26 may also be heat sealed (welded) to the anode top frame 9A.

The above described construction makes large lithium-seawater and lithium-air single semi-fuel cells possible.

Figure 10:
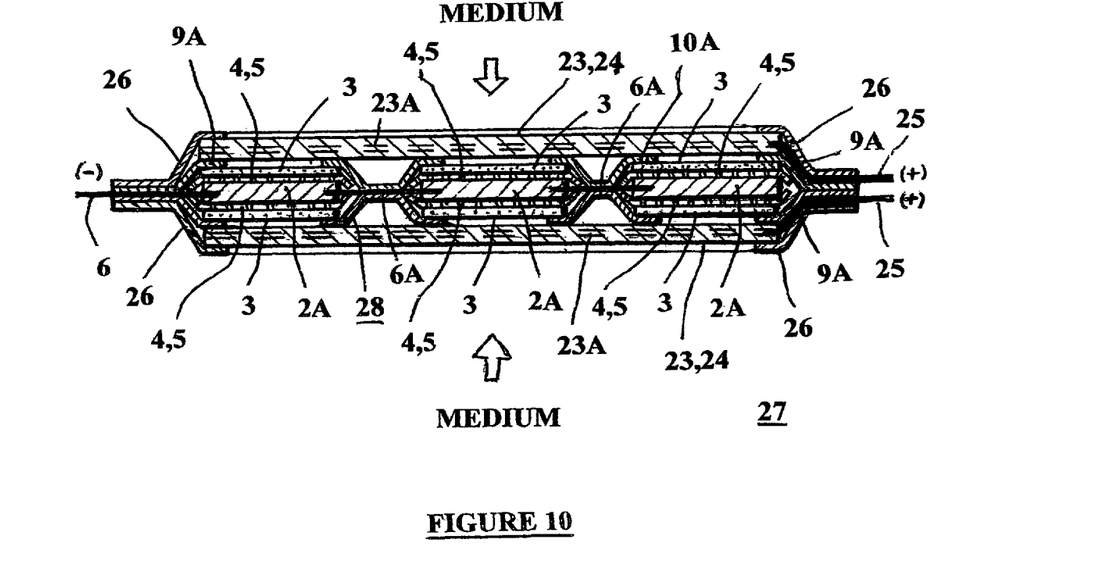
FIG. 10 is a sectional schematic view, illustrating a large lithium-seawater or lithium-air bi-cell, having multiple protected anodes integrated with two porous carbon or metal cathodes facing the medium, and all parts are held together by a flexible pouch material.

Another embodiment of the invention is shown in FIG. 10, showing large Lithium-seawater, or lithium-air bi-cell 27, which comprises:

Large anode assembly 28 of a plurality of smaller lithium anodes 2, electrically connected by metal connectors 6A, and protected by ceramic layers 3, electrospun membranes 4 with electrolyte 5, and having terminal tab 6 (−), all sandwiched and heat sealed between two flexible frames 9A; two cathodes 23 for lithium-seawater bi-cell, or two cathodes 24 for lithium-air bi-cells connected to two terminal tabs 25 (+); and two flexible frames 26, heat sealed to the frames 9A. Two cathode tabs 25 (+) may be ultrasonically welded together, or otherwise electrically connected.

This cell construction doubles the energy capacity of the single cell 22, and also makes large lithium-seawater and lithium-air bi-cells possible.

Figure 11:
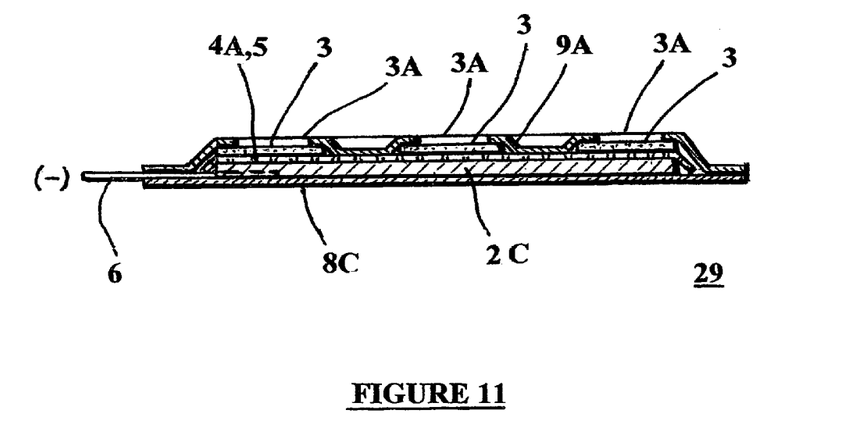
FIG. 11 is a sectional schematic view, illustrating a large lithium-seawater or lithium-air anode packaging having multiple small ceramic membranes on one large anode.

Another large anode packaging construction for lithium-seawater and lithium-air semi-fuel cells is shown in FIG. 11, which is another embodiment of the invention, and which illustrates large anode assembly 29 having lithium-sheet 2C with terminal tab 6 (−) hermetically heat sealed under vacuum between at least one flexible base layer 8C and at least one top layer 9A, protected by at least one flexible porous inert membrane 4A and by a plurality of smaller glass-ceramic membranes 3, heat sealed to the flexible layer 9A, within the foot print of the anode 2A. Membrane 4A is in contact with the lithium-anode sheet 2A and is saturated with the described electrolyte 5. Membranes 3 are in contact with membrane 4A due to the vacuum packing. For each membrane 3 there is opening 3A in the layer 9A for lithium-ions flow to a cathode (not shown).

Figure 12:
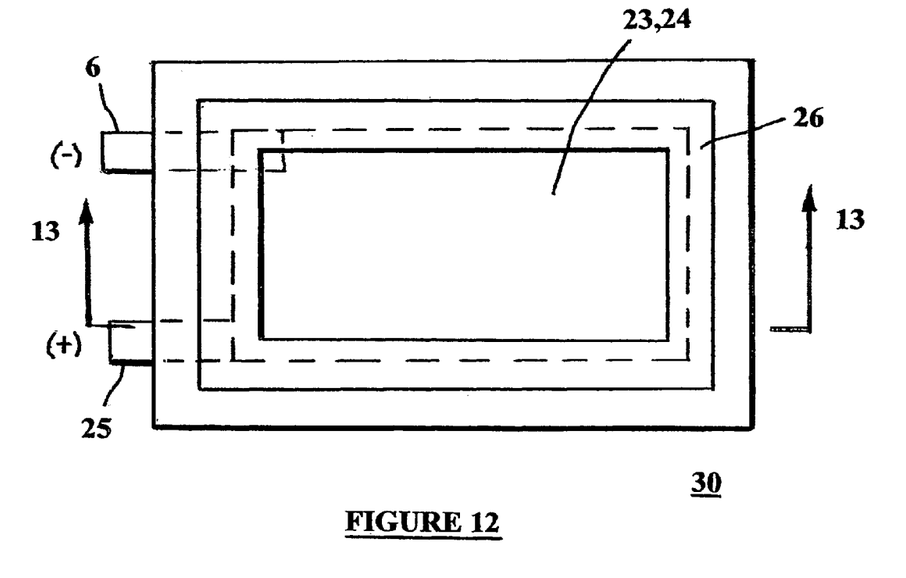
FIG. 12 is a top view of another large lithium-seawater or lithium-air single semi-fuel cell.
Figure 13:
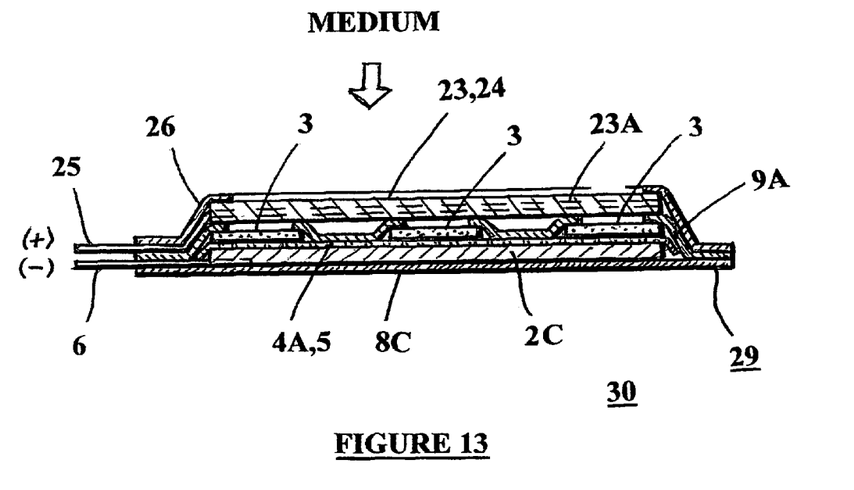
FIG. 13 is a sectional schematic view on the line 13-13 of FIG. 12, illustrating large lithium-seawater or lithium-air single semi-fuel cell with one integrated cathode facing multiple small ceramic membranes of the anode packaging.

Another embodiment of the invention is shown in FIGS. 12 and 13, illustrating large single lithium-seawater or lithium-air semi-fuel cell 30 comprising the anode assembly 29, with terminal tab 6 (−); cathode 23 for lithium-seawater cell, or cathode 24 for lithium-air cell, electrically connected to terminal 25 (+); and cathode flexible top frame 26, welded to the anode assembly 29. This construction results in fewer components than in the cell 22, having the same performance. Cathodes 23 and 24 have the same construction as cathodes 14 and 16 respectively.

Figure 14:
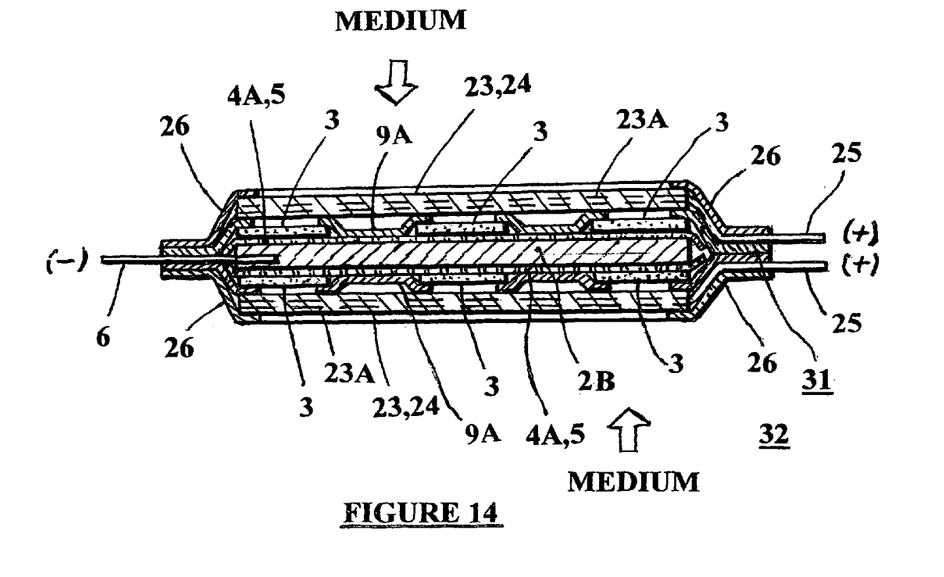
FIG. 14 is a sectional schematic view illustrating a large lithium-seawater, or lithium-air bi-cell, having multiple small ceramic membranes facing two integrated cathodes.

Referring now to FIG. 14, another embodiment of the invention is illustrated, showing lithium-seawater or lithium-air large bi-cells 32, comprising:

Large flat lithium anode assembly 31 which includes lithium sheet 2B with at least one terminal tab 6 (−) sandwiched between at least two flexible inert membranes 4A, saturated with lithium ion conductive electrolyte 5, and at least two flexible layers 9A, having a plurality of glass-ceramic membranes 3 hermetically heat sealed at openings 3A, to the layers 9A, within the footprint of the anode 2B; and two cathodes 23 or 24 facing the membranes 3 on the outside, and attached to the anode assembly 31 by at least two flexible frames 26. The anode assembly 31 is hermetically sealed under vacuum first by welding the two flexible layers 9A together, and to the terminal tab 6, as shown and is described for cells 18 and 19.

This configuration results in fewer components than in the bi-cell 27, having the same performance. Cathodes 23 and 24 have the same construction as cathodes 14 and 16 respectively.

It is apparent that two opposite hand single cells 12 or 13 or 22, or 30, can also be assembled preferably by an adhesive with the cathodes facing outside, which results in similar performances as bi-cells 18, or 19, or 27 or 32, respectively, but they will be thicker and heavier, due to the packing layers 8 and 8C (not shown).

It is apparent to a person skilled in the art, that the entire negative terminal tabs 6 (−) as shown in all FIGURES, must be insulated from the surrounding media, like water etc. (not shown).

It should be noted that all described components above are compliant and flexible, except the glass-ceramic membranes 3. This flexibility and the packing under vacuum provides for pressure equalization and thus high resistance to rupture under water.

It is also apparent from the description, that the anodes and cells can be made into virtually any desired shape and size, and that the cells can be connected in parallel and/or series to create multi-celled high voltage semi-fuel cells.

Described hermetic sealing of anodes also permits the lithium-seawater type cells to function when submerged into various other media, such as aqueous acids, bases, and neutrals; and the lithium-air type cells will function also in other media gases, such as oxygen.

Figure 15:
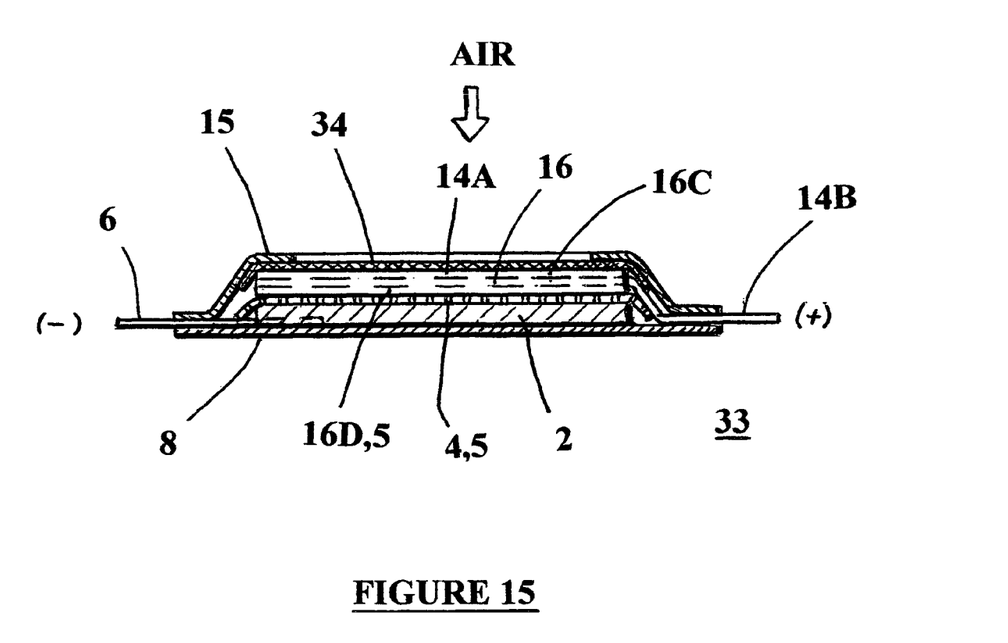
FIG. 15 is a sectional schematic view illustrating a single lithium-air semi-fuel cell having an oxygen selective hydrophobic membrane laminated to the outer surface of the cathode.

Lithium-air semi-fuel cells shown in FIGS. 4 and 13 may be also constructed differently, as shown in FIG. 15, illustrating a lithium-air single semi-fuel cell 33, which is another embodiment of the invention, and in which the glass-ceramic membrane 3 is removed and replaced with at least one thin polymeric, water impermeable, oxygen selective membrane 34, which membrane is laminated onto the outer layer 16C of the fuel cell type cathode 16. The flexible frame 9 or 9A may be also removed, as shown. The non-aqueous electrolyte 5 is soaked into the membrane 4 and into the inner layer 16D of the cathode 16. The aqueous electrolyte 17 is omitted.

The oxygen selective, hydrophobic membrane 34 permits the oxygen from the surrounding air to enter the cathode, but it does not permit the electrolyte to evaporate, and does not permit water moisture in air into the cell.

Therefore, this membrane makes the masking tape over the cathode, and its removal before use unnecessary. The cell is ready for use as is, and will provide electric current, when an electric load is applied to the cell.

The flexible frame 15 is hermetically heat sealed to the membrane 34 and holds the membrane in place and also encapsulates the cell by being heat sealed all around to the flexible base layer 8. The terminal tabs 6 and 14B are also heat sealed between the base 8 and the frame 15.

It is apparent that this construction can be similarly applied to create similar bi-cells and large cells as described above.

Primary applications of the described semi-fuel cells are for powering deep seawater sensors, underwater vehicles (manned or unmanned), and aerial vehicles, such as electric airplanes and UAV's.

It should, of course be understood, that the description and the drawings herein are merely illustrative and it will be apparent, that various modifications, combinations and changes can be made of the structures and the systems disclosed without departing from the spirit of the invention and from the scope of the appended claims.

It will thus be seen, that novel and improved cells' structures have been provided with which the objects of the invention are achieved.

We claim:

1. Flexible and hermetically sealed lithium metal anode packaging for large lithium-seawater and lithium-air single semi-fuel cells, which packaging comprises:
   At least one flexible compliant base layer of a metal foil coated with an electrically insulating heat sealable plastic;
   a flat lithium metal anode, smaller than and in contact with said flexible base layer, in overlaying relation;
   at least one metal foil terminal electrically connected to said lithium anode, and extending out of said base layer, and heat sealed to said base layer,
   at least one porous and flexible inert membrane covering and in contact with said lithium anode, and which membrane is saturated with a lithium ion conductive non-aqueous electrolyte, stable against lithium;
   a plurality of glass-ceramic water-impermeable lithium ion conductive membranes in contact with said porous flexible inert membrane and with said electrolyte, within footprint of said anode;
   at least one flexible compliant top layer of a metal foil coated with a heat sealable an electrically insulating plastic, said top layer having openings of matching quantity and positions of said glass-ceramic membranes, and in contact with said glass-ceramic membranes, and hermetically heat sealed to said glass-ceramic membranes, and under vacuum during said sealing to said flexible base layer and to said metal foil terminal, in overlaying relation.

2. Lithium-seawater single semi-fuel cell, which comprises:
   a flat lithium anode hermetically sealed in a flexible and compliant packaging, as described in claim 1;
   a flat and flexible porous carbon cathode, coated onto and electro conductively bonded to a flexible porous metal collector,
   at least one flexible compliant frame layer of a metal foil coated with a heat sealable plastic, heat sealed to said porous carbon cathode and to said lithium anode packaging, in overlaying relation;
   a metal terminal electrically connected to said metal collector and extending out of said flexible frame layer.

3. Lithium-seawater single semi-fuel cell, which comprises:
   a flat lithium anode hermetically sealed in a flexible and compliant packaging as described in claim 1;
   a flat and flexible porous metal cathode, electro conductively attached to a flexible porous metal collector,
   at least one flexible compliant frame layer of a metal foil coated with a heat sealable plastic, heat sealed to said porous metal cathode and to said lithium anode packaging, in overlaying relation;
   at least one metal terminal electrically connected to said metal cathode and extending out of said flexible frame layer.

4. Lithium-air single semi-fuel cell, which comprises:
   a flat lithium anode hermetically sealed in a flexible and compliant packaging, as described in claim 1;
   a flat and flexible fuel cell type cathode having its inner layer facing said glass-ceramic membrane saturated with an aqueous based electrolyte and in contact with said glass-ceramic membrane;
   at least one flexible compliant frame layer of a metal foil coated with a heat sealable plastic, heat sealed to said fuel cell type cathode and to said lithium anode packaging, in overlaying relation;
   at least one metal terminal electrically connected to said cathode and extending out of said flexible frame layer.

5. Lithium-air semi-fuel cell, which comprises:
   At least one flexible compliant base layer of metal foil coated with electrically insulating heat sealable plastic;
   a flat lithium metal anode, smaller than and in contact with said flexible base layer, in overlaying relation;

at least one metal foil terminal electrically connected to said lithium anode, and extending out of said base layer, and hermetically heat sealed to said base layer;

at least one porous and flexible inert membrane covering and in contact with said lithium anode, and which membrane is saturated with lithium ion conductive non-aqueous electrolyte, stable against lithium:

a flat fuel cell type cathode having inner and outer layers, and said inner layer facing said porous membrane is saturated with a lithium ion conductive non-aqueous electrolyte, stable against lithium;

at least one polymeric, water and electrolyte impermeable, oxygen selective membrane covering said cathode's outer layer in overlaying relation;

at least one flexible compliant frame layer of metal foil coated with a heat sealable plastic, hermetically heat sealed to said oxygen selective membrane and to said flexible compliant base layer and to said metal foil terminal, in overlaying relation;

at least one metal foil terminal electrically connected to said cathode and extending out of said flexible frame layer and said flexible base layer, and hermetically heat sealed between said base layer and said frame layer.

6. Lithium-seawater single semi-fuel cell, which comprises:

Flexible and hermetically sealed lithium metal anode packaging for lithium-seawater and lithium-air single semi-fuel cells, which packaging comprises:

At least one flexible compliant base layer of a metal foil coated with an electrically insulating heat sealable plastic;

a flat lithium metal anode, smaller than and in contact with said flexible base layer, in overlaying relation;

at least one metal foil terminal electrically connected to said lithium anode, and extending out of said base layer, and hermetically heat sealed to said base layer;

at least one porous and flexible inert membrane covering and in contact with said lithium anode, and which membrane is saturated with a lithium ion conductive non-aqueous electrolyte, stable against lithium;

at least one glass-ceramic water-impermeable, lithium ions conductive membrane in contact with said flexible inert membrane and with said electrolyte;

at least one flexible compliant frame layer of a metal foil coated with a heat sealable plastic, which is in contact with said glass-ceramic membrane and is hermetically heat sealed to said glass-ceramic membrane and under vacuum during said sealing to said flexible base layer and to said metal foil terminal, in overlaying relation; and a flat and flexible porous carbon cathode coated onto and electro-conductively bonded to a flexible porous metal collector, at least one flexible compliant frame layer of a metal foil coated with a heat sealable plastic, heat sealed to said porous carbon cathode and to said lithium anode packaging, in overlaying relation, a metal terminal electrically connected to said metal collector and extending out of said flexible frame layer.

7. Lithium-seawater single semi-fuel cell, which comprises:

Flexible and hermetically sealed lithium metal anode packaging for lithium-seawater and lithium-air single semi-fuel cells, which packaging comprises:

At least one flexible compliant base layer of a metal foil coated with an electrically insulating heat sealable plastic;

a flat lithium metal anode, smaller than and in contact with said flexible base layer, in overlaying relation;

at least one metal foil terminal electrically connected to said lithium anode, and extending out of said base layer, and hermetically heat sealed to said base layer;

at least one porous and flexible inert membrane covering and in contact with said lithium anode, and which membrane is saturated with a lithium ion conductive non-aqueous electrolyte, stable against lithium;

at least one glass-ceramic water-impermeable, lithium ions conductive membrane in contact with said flexible inert membrane and with said electrolyte;

at least one flexible compliant frame layer of a metal foil coated with a heat sealable plastic, which is in contact with said glass-ceramic membrane and is hermetically heat sealed to said glass-ceramic membrane and under vacuum during said sealing to said flexible base layer and to said metal foil terminal, in overlaying relation; and a flat and flexible porous metal cathode, electro-conductively attached to a flexible porous metal collector, at least one flexible compliant frame layer of a metal foil coated with a heat sealable plastic, heat sealed to said porous metal cathode and to said lithium anode packaging, in overlaying relation, at least one metal terminal electrically connected to said metal cathode and extending out of said flexible frame layer.

8. Lithium-air single semi-fuel cell, which comprises:

Flexible and hermetically sealed lithium metal anode packaging for lithium-seawater and lithium-air single semi-fuel cells, which packaging comprises:

At least one flexible compliant base layer of a metal foil coated with an electrically insulating heat sealable plastic;

a flat lithium metal anode, smaller than and in contact with said flexible base layer, in overlaying relation;

at least one metal foil terminal electrically connected to said lithium anode, and extending out of said base layer, and hermetically heat sealed to said base layer;

at least one porous and flexible inert membrane covering and in contact with said lithium anode, and which membrane is saturated with a lithium ion conductive non-aqueous electrolyte, stable against lithium;

at least one glass-ceramic water-impermeable, lithium ions conductive membrane in contact with said flexible inert membrane and with said electrolyte;

at least one flexible compliant frame layer of a metal foil coated with a heat sealable plastic, which is in contact with said glass-ceramic membrane and is hermetically heat sealed to said glass-ceramic membrane and under vacuum during said sealing to said flexible base layer and to said metal foil terminal, in overlaying relation; and a flat and flexible fuel cell type cathode having inner and outer layers, and said inner layer facing said glass-ceramic membrane saturated with an aqueous based electrolyte and in contact with said glass-ceramic membrane;

at least one flexible compliant frame layer of a metal foil coated with a heat sealable plastic, heat sealed to said fuel cell type cathode and to said lithium anode packaging, in overlaying relation;

at least one metal foil terminal electrically connected to said cathode and extending out of said flexible frame layer.

9. Lithium-seawater bi-cell, which comprises:

Flexible and hermetically sealed lithium metal anode packaging for lithium-seawater and lithium-air bi-cells, which packaging comprises:

A flat lithium metal anode, having two sides;

at least two porous and flexible inert membranes covering both sides of and in contact with said lithium anode, and which membranes are saturated with a lithium ion conductive non-aqueous electrolyte, stable with lithium, and said flexible membrane having inner and outer surfaces;

at least two glass-ceramic water-impermeable lithium ions conductive membranes in contact with said outer surface of said flexible inert membranes and said electrolyte, and said glass-ceramic membranes having inner and outer surfaces;

at least two flexible compliant frames' layers of a metal foil coated with a heat sealable and electrically insulating plastic, which frame layers are in contact with outer surface of said glass-ceramic membranes and are hermetically heat sealed to said said glass-ceramic membranes and to each other under vacuum;

at least one metal foil terminal electrically connected to said lithium metal anode, and extending out of said flexible frames' layers, and hermetically heat sealed to said flexible frames' layers under vacuum during said sealing; and two flat and flexible carbon cathodes coated onto and electro conductively bonded to flexible and porous metal collectors, said cathodes facing said outer surfaces of said glass-ceramic membranes in said anode packaging;

at least two flexible compliant frame layers of a metal foil coated with a heat sealable plastic, heat sealed to said porous carbon cathodes and to said anode packaging, in overlaying relation;

at least two metal terminals electrically connected to said cathode metal collectors and extending out of said flexible frame's layers.

10. Lithium-seawater bi-cell, which comprises:

Flexible and hermetically sealed lithium metal anode packaging for lithium-seawater and lithium-air bi-cells, which packaging comprises:

A flat lithium metal anode, having two sides;

at least two porous and flexible inert membranes covering both sides of and in contact with said lithium anode, and which membranes are saturated with a lithium ion conductive non-aqueous electrolyte, stable with lithium, and said flexible membrane having inner and outer surfaces;

at least two glass-ceramic water-impermeable lithium ions conductive membranes in contact with said outer surface of said flexible inert membranes and said electrolyte, and said glass-ceramic membranes having inner and outer surfaces;

at least two flexible compliant frames' layers of a metal foil coated with a heat sealable and electrically insulating plastic, which frame layers are in contact with outer surface of said glass-ceramic membranes and are hermetically heat sealed to said said glass-ceramic membranes and to each other under vacuum;

at least one metal foil terminal electrically connected to said lithium metal anode, and extending out of said flexible frames' layers, and hermetically heat sealed to said flexible frames' layers under vacuum during said sealing; and two flat and flexible metal cathodes electro-conductively attached to flexible and porous metal collectors, said cathode facing said outer surfaces of said glass-ceramic membranes in said anode packaging;

at least two flexible compliant frame layers of a metal foil coated with heat sealable plastic, heat sealed to said porous metal cathodes and to said anode packaging, in overlaying relation;

at least two metal terminals electrically connected to said metal cathodes extending out of said flexible frame layers.

11. Lithium-air bi-cell, which comprises:

Flexible and hermetically sealed lithium metal anode packaging for lithium-seawater and lithium-air bi-cells, which packaging comprises:

A flat lithium metal anode, having two sides;

at least two porous and flexible inert membranes covering both sides of and in contact with said lithium anode, and which membranes are saturated with a lithium ion conductive non-aqueous electrolyte, stable with lithium, and said flexible membrane having inner and outer surfaces;

at least two glass-ceramic water-impermeable lithium ions conductive membranes in contact with said outer surface of said flexible inert membranes and said electrolyte, and said glass-ceramic membranes having inner and outer surfaces;

at least two flexible compliant frames' layers of a metal foil coated with a heat sealable and electrically insulating plastic, which frame layers are in contact with outer surface of said glass-ceramic membranes and are hermetically heat sealed to said said glass-ceramic membranes and to each other under vacuum;

at least one metal foil terminal electrically connected to said lithium metal anode, and extending out of said flexible frames' layers, and hermetically heat sealed to said flexible frames' layers under vacuum during said sealing; and two flat and flexible fuel cell type cathodes having inner and outer layers, and said inner layers facing said glass-ceramic membranes saturated with an aqueous based electrolyte and in contact with said glass-ceramic membranes;

at least two flexible complaint frame layers of a metal foil coated with a heat sealable plastic, heat sealed to said cathodes and to said anode packaging, in overlaying relation;

at least two metal terminal electrically connected to said cathodes and extending out of said flexible frame layers.

12. Lithium-seawater multi-anode single semi-fuel cell, which comprises:

Flexible and hermetically sealed lithium metal multi-anode packaging for lithium-seawater and lithium-air single semi-fuel cells, which packaging comprises:

At least one flexible complaint base layer of a metal foil coated with an electrically insulating heat sealable plastic;

a plurality of flat lithium metal anodes' sheets positioned on and in contact with said flexible base layer, within the foot print of said base layer, in overlaying relation;

at least one metal foil terminal electrically connected to at least one of said lithium anodes and extending out of said base layer, and heat sealed to said base layer;

a plurality of metal foil connectors electrically connecting all said anode sheets, heat sealed to said base layer;

a plurality of porous and flexible inert membranes individually covering and in contact with all said anode sheets and which membranes are saturated with a lithium ion conductive non-aqueous electrolyte, stable against lithium;

a plurality of glass-ceramic water-impermeable, lithium ions conductive membranes in contact with all said flexible inert membranes and with said electrolyte;

at least one flexible compliant top layer of a metal foil coated with a heat sealable and electrically insulating plastic, said top layer having openings of matching quantity and positions of said glass-ceramic membranes and is in contact with said glass-ceramic membranes and is hermetically heat sealed to said glass-ceramic membranes, and under vacuum during said sealing to said flexible base layer and to said metal foil terminal and to said metal foil connectors, in overlaying relation; and a flat and flexible porous carbon cathode coated onto and electro conductively bonded to a flexible porous metal collector;

at least one flexible compliant frame layer of a metal foil coated with a heat sealable plastic, heat sealed to said porous carbon cathode and to said lithium metal multi-anode packaging, in overlaying relation;

a metal terminal electrically connected to said metal collector and extending out of said flexible frame layer.

13. Lithium-seawater multi-anode single semi-fuel cell, which comprises:

Flexible and hermetically sealed lithium metal multi-anode packaging for lithium-seawater and lithium-air single semi-fuel cells, which packaging comprises:

At least one flexible complaint base layer of a metal foil coated with an electrically insulating heat sealable plastic;

a plurality of flat lithium metal anodes' sheets positioned on and in contact with said flexible base layer, within the foot print of said base layer, in overlaying relation;

at least one metal foil terminal electrically connected to at least one of said lithium anodes and extending out of said base layer, and heat sealed to said base layer;

a plurality of metal foil connectors electrically connecting all said anode sheets, heat sealed to said base layer;

a plurality of porous and flexible inert membranes individually covering and in contact with all said anode sheets and which membranes are saturated with a lithium ion conductive non-aqueous electrolyte, stable against lithium;

a plurality of glass-ceramic water-impermeable, lithium ions conductive membranes in contact with all said flexible inert membranes and with said electrolyte;

at least one flexible compliant top layer of a metal foil coated with a heat sealable and electrically insulating plastic, said top layer having openings of matching quantity and positions of said glass-ceramic membranes and is in contact with said glass-ceramic membranes and is hermetically heat sealed to said glass-ceramic membranes, and under vacuum during said sealing to said flexible base layer and to said metal foil terminal and to said metal foil connectors, in overlaying relation; and a flat and flexible porous metal cathode electro-conductively attached to a flexible porous metal collector;

at least one flexible compliant frame layer of a metal foil coated with a heat sealable plastic, heat sealed to said porous metal cathode and to said lithium metal multi-anode packaging, in overlaying relation;

a metal terminal electrically connected to said metal cathode and extending out of said flexible frame layer.

14. Lithium-air multi-anode single semi-fuel cell, which comprises:

Flexible and hermetically sealed lithium metal multi-anode packaging for lithium-seawater and lithium-air single semi-fuel cells, which packaging comprises:

At least one flexible complaint base layer of a metal foil coated with an electrically insulating heat sealable plastic;

a plurality of flat lithium metal anodes' sheets positioned on and in contact with said flexible base layer, within the foot print of said base layer, in overlaying relation;

at least one metal foil terminal electrically connected to at least one of said lithium anodes and extending out of said base layer, and heat sealed to said base layer;

a plurality of metal foil connectors electrically connecting all said anode sheets, heat sealed to said base layer, a plurality of porous and flexible inert membranes individually covering and in contact with all said anode sheets and which membranes are saturated with a lithium ion conductive non-aqueous electrolyte, stable against lithium;

a plurality of glass-ceramic water-impermeable, lithium ions conductive membranes in contact with all said flexible inert membranes and with said electrolyte;

at least one flexible compliant top layer of a metal foil coated with a heat sealable and electrically insulating plastic, said top layer having openings of matching quantity and positions of said glass-ceramic membranes and is in contact with said glass-ceramic membranes and is hermetically heat sealed to said glass-ceramic membranes, and under vacuum during said sealing to said flexible base layer and to said metal foil terminal and to said metal foil connectors, in overlaying relation; and a flat and flexible fuel cell type cathode having inner and outer layers, and said inner layer facing said glass-ceramic membranes saturated with an aqueous based electrolyte and in contact with said glass-ceramic membranes;

at least one flexible compliant frame layer of a metal foil coated with a heat sealable plastic, heat sealed to said fuel cell type cathode and to said lithium metal multi-anode packaging, in overlaying relation;

a metal terminal electrically connected to said cathode and extending out of said flexible frame layer.

15. Lithium-seawater multi-anode bi-cell which comprises:

Flexible and hermetically sealed lithium metal multi-anode packaging for lithium-seawater and lithium-air bi-cells, which packaging comprises:

A plurality of flat lithium metal anode sheets sandwiched between a plurality of flexible inert membranes individually covering and in contact with all said anode sheets and which membranes are saturated with a lithium ion conductive non-aqueous electrolyte, stable against lithium, and all said anode sheets are electrically connected by a plurality of metal foil connectors;

a plurality of glass-ceramic water-impermeable lithium ions conductive membranes in contact with all said flexible inert membranes and said electrolyte, in overlaying relations;

at least two flexible compliant layers of metal foil coated with a heat sealable and electrically insulating plastic, said layers having openings of matching quantity and positions of said glass-ceramic membranes, and are in contact with said glass-ceramic membranes, and are hermetically heat sealed to said glass-ceramic membranes and to said metal foil connectors and to each other under vacuum;

at least one metal foil terminal electrically connected to at least one said lithium metal anode sheet and extending out of said flexible layers, and hermetically heat sealed to said flexible layers under vacuum during said sealing; and two flat and flexible carbon cathodes coated onto and electro conductively bonded to flexible and porous metal collectors, said cathodes facing said outer surface of said glass ceramic membranes in said anode packaging;

at least two flexible compliant frame layers of a metal foil coated with a heat sealable plastic, heat sealed to said porous carbon cathodes and to said anode packaging, in overlaying relation;

at least two metal terminals electrically connected to said metal collectors and extending out of said flexible frame layers.

16. Lithium-seawater multi-anode bi-cell, which comprises:

Flexible and hermetically sealed lithium metal multi-anode packaging for lithium-seawater and lithium-air bi-cells, which packaging comprises:

A plurality of flat lithium metal anode sheets sandwiched between a plurality of flexible inert membranes individually covering and in contact with all said anode sheets and which membranes are saturated with a lithium ion conductive non-aqueous electrolyte, stable against lithium, and all said anode sheets are electrically connected by a plurality of metal foil connectors;

a plurality of glass-ceramic water-impermeable lithium ions conductive membranes in contact with all said flexible inert membranes and said electrolyte, in overlaying relations;

at least two flexible compliant layers of metal foil coated with a heat sealable and electrically insulating plastic, said layers having openings of matching quantity and positions of said glass-ceramic membranes, and are in contact with said glass-ceramic membranes, and are hermetically heat sealed to said glass-ceramic membranes and to said metal foil connectors and to each other under vacuum;

at least one metal foil terminal electrically connected to at least one said lithium metal anode sheet and extending out of said flexible layers, and hermetically heat sealed to said flexible layers under vacuum during said sealing; and two flat and flexible metal cathodes coated onto and electro-conductively attached to flexible and porous metal collectors, said cathodes facing said outer surfaces of said glass-ceramic membranes in said anode packaging;

at least two flexible compliant frame layers of a metal foil coated with a heat sealable plastic, heat sealed to said porous metal cathodes and to said anode packaging, in overlaying relation;

at least two metal terminals electrically connected to said metal cathodes and extending out of said flexible frame layers.

17. Lithium-seawater bi-cell, which comprises:

Flexible and hermetically sealed lithium metal anode packaging for lithium-seawater and lithium-air bi-cells, which packaging comprises:

A flat lithium metal anode, having two sides;

at least two porous and flexible inert membranes covering both sides of and in contact with said lithium anode, and which membranes are saturated with a lithium ions conductive non-aqueous electrolyte, stable with lithium, and said flexible membranes having inner and outer surfaces;

a plurality of glass-ceramic water-impermeable lithium ions conductive membranes in contact with outer surfaces of said flexible inert membranes and with said electrolyte, within footprint of said anode, and said glass-ceramic membranes having inner and outer surfaces;

at least two flexible compliant frames' layers of a metal foil coated with a heat sealable and electrically insulating plastic, which layers are in contact with said outer surfaces of said glass-ceramic membranes and are hermetically heat sealed to said glass-ceramic membranes and to each other under vacuum;

at least one metal foil terminal electrically connected to said lithium metal anode, and extending out of said flexible frames' layers, and hermetically heat sealed to said flexible frames' layers under vacuum during said sealing; and two flat and flexible carbon cathodes coated onto and electro-conductively bonded to flexible and porous metal collectors, said cathodes facing said outer surfaces of said glass-ceramic membranes in said anode packaging;

at least two flexible compliant frame layers of a metal foil coated with a heat sealable plastic, heat sealed to said porous carbon cathodes and to said anode packaging, in overlaying relation;

at least two metal terminals electrically connected to said cathode metal collectors and extending out of said flexible frames' layers.

18. Lithium-seawater bi-cell, which comprises:

Flexible and hermetically sealed lithium metal anode packaging for lithium-seawater and lithium-air bi-cells, which packaging comprises:

A flat lithium metal anode, having two sides;

at least two porous and flexible inert membranes covering both sides of and in contact with said lithium anode, and which membranes are saturated with a lithium ions conductive non-aqueous electrolyte, stable with lithium, and said flexible membranes having inner and outer surfaces;

a plurality of glass-ceramic water-impermeable lithium ions conductive membranes in contact with outer surfaces of said flexible inert membranes and with said electrolyte, within footprint of said anode, and said glass-ceramic membranes having inner and outer surfaces;

at least two flexible compliant frames' layers of a metal foil coated with a heat sealable and electrically insulating plastic, which layers are in contact with said outer surfaces of said glass-ceramic membranes and are hermetically heat sealed to said glass-ceramic membranes and to each other under vacuum;

at least one metal foil terminal electrically connected to said lithium metal anode, and extending out of said flexible frames' layers, and hermetically heat sealed to said flexible frames' layers under vacuum during said sealing; and two flat and flexible metal cathodes electro-conductively attached to flexible and porous metal collectors, said cathode facing said outer surfaces of said glass-ceramic membranes in said anode packaging;

at least two flexible compliant frame layers of a metal foil coated with a heat sealable plastic, heat sealed to said porous metal cathodes and to said anode packaging, in overlaying relation;

at least two metal terminals electrically connected to said metal cathodes and extending out of said flexible frame layers.

19. Lithium-air bi-cell, which comprises:

Flexible and hermetically sealed lithium metal anode packaging for lithium-seawater and lithium-air bi-cells, which packaging comprises:

A flat lithium metal anode, having two sides;

at least two porous and flexible inert membranes covering both sides of and in contact with said lithium anode, and which membranes are saturated with a lithium ions conductive non-aqueous electrolyte, stable with lithium, and said flexible membranes having inner and outer surfaces;

a plurality of glass-ceramic water-impermeable lithium ions conductive membranes in contact with outer surfaces of said flexible inert membranes and with said electrolyte, within footprint of said anode, and said glass-ceramic membranes having inner and outer surfaces;

at least two flexible compliant frames' layers of a metal foil coated with a heat sealable and electrically insulating plastic, which layers are in contact with said outer surfaces of said glass-ceramic membranes and are hermetically heat sealed to said glass-ceramic membranes and to each other under vacuum;

at least one metal foil terminal electrically connected to said lithium metal anode, and extending out of said flexible frames' layers, and hermetically heat sealed to said flexible frames' layers under vacuum during said sealing; and two flat and flexible fuel cell type cathodes having inner and outer layers, and said inner layers facing said glass-ceramic membranes saturated with an aqueous based electrolyte and in contact with said glass-ceramic membranes;

at least two flexible compliant frame layers of a metal foil coated with a heat sealable plastic, heat sealed to said cathodes and to said anode packaging in overlaying relation;

at least two metal terminals electrically connected to said cathodes and extending out of said flexible frame layers.

20. Lithium-air multi-anode bi-cell, which comprises:

Flexible and hermetically sealed lithium metal multi-anode packaging for lithium-seawater and lithium-air bi-cells, which packaging comprises:

A plurality of flat lithium metal anode sheets sandwiched between a plurality of flexible inert membranes individually covering and in contact with all said anode sheets and which membranes are saturated with a lithium ion conductive non-aqueous electrolyte, stable against lithium, and all said anode sheets are electrically connected by a plurality of metal foil connectors;

a plurality of glass-ceramic water-impermeable lithium ions conductive membranes in contact with all said flexible inert membranes and said electrolyte, in overlaying relations during said sealing; and two flat and flexible fuel cell type cathodes having inner and outer layers, and said inner layers facing said glass-ceramic membranes saturated with an aqueous based electrolyte and in contact with said glass-ceramic membranes, in said anode packaging;

at least two flexible compliant frame layers of a metal foil coated with a heat sealable plastic, heat sealed to said cathodes and to said anode packaging, in overlaying relation;

at least two metal terminals electrically connected to said metal cathodes and extending out of said flexible frame layers.

* * * * *